(12) United States Patent
De Mersseman

(10) Patent No.: US 7,404,784 B2
(45) Date of Patent: Jul. 29, 2008

(54) FUEL SAVING SENSOR SYSTEM

(75) Inventor: Bernard De Mersseman, Rochester Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 310 days.

(21) Appl. No.: 11/282,050

(22) Filed: Nov. 17, 2005

(65) Prior Publication Data

US 2007/0111857 A1    May 17, 2007

(51) Int. Cl.
*F16H 59/60* (2006.01)
*B60W 10/06* (2006.01)
*B60T 7/12* (2006.01)
*G05D 1/02* (2006.01)

(52) U.S. Cl. .......................... 477/97; 477/200; 701/96; 701/300

(58) Field of Classification Search ............ 477/3, 477/4, 92, 97, 115, 199, 200, 902; 701/96, 701/300, 301, 302
See application file for complete search history.

(56) References Cited

U.S. PATENT DOCUMENTS

| | | | |
|---|---|---|---|
| 5,173,859 A * | 12/1992 | Deering ...................... | 701/70 |
| 6,283,086 B1 * | 9/2001 | Yamamoto et al. ....... | 123/198 D |
| 6,425,365 B1 | 7/2002 | Peters et al. | |
| 6,873,911 B2 * | 3/2005 | Nishira et al. ............... | 701/301 |
| 7,099,768 B2 * | 8/2006 | Moriya ....................... | 701/112 |
| 2003/0221886 A1 | 12/2003 | Petrie, Jr. | |
| 2004/0144107 A1 | 7/2004 | Breton et al. | |
| 2005/0149263 A1* | 7/2005 | Chow .......................... | 701/301 |
| 2007/0112494 A1* | 5/2007 | Naik et al. .................... | 701/55 |

FOREIGN PATENT DOCUMENTS

| | | |
|---|---|---|
| CA | 2 387 317 | 11/2002 |
| DE | 42 00 542 A1 | 6/1992 |
| DE | 42 03 071 A1 | 8/1993 |
| EP | 1 074 417 A2 | 2/2001 |
| FR | 2 827 237 | 1/2003 |
| IT | UD940175 | 4/1996 |
| JP | 55-148624 | 11/1980 |
| JP | 11-257121 | 9/1999 |
| JP | 2001-248468 | 9/2001 |
| JP | 2001-263117 | 9/2001 |
| JP | 2002-021993 | 1/2002 |
| JP | 2002-115635 | 4/2002 |
| JP | 2002-147325 | 5/2002 |
| JP | 2002-188480 | 7/2002 |
| JP | 2002-213261 | 7/2002 |
| JP | 2002-213270 | 7/2002 |

(Continued)

OTHER PUBLICATIONS

Stop & Start Media Presentation, Sep. 7, 2004.

*Primary Examiner*—Roger Pang
(74) *Attorney, Agent, or Firm*—Sally J Brown; Brinks Hofer Glison & Lione

(57) ABSTRACT

The system includes an engine, a sensor, and a controller. The engine provides a driving motion for the vehicle. The sensor unit is configured to determine a range of a leading vehicle. The controller is in communication with the engine and the sensor unit, such that the controller may shut down the engine based on the range of the lead vehicle as determined by the sensor unit.

17 Claims, 3 Drawing Sheets

FOREIGN PATENT DOCUMENTS

| | | |
|---|---|---|
| JP | 2002-242746 | 8/2002 |
| JP | 2002-303171 | 10/2002 |
| JP | 2002-303172 | 10/2002 |
| JP | 2003226154 A * | 8/2003 |
| JP | 2004-044469 | 2/2004 |
| JP | 2004-115015 | 4/2004 |
| JP | 2004-225584 | 8/2004 |
| JP | 2004-234260 | 8/2004 |
| JP | 2004-276868 | 10/2004 |
| WO | WO 02/97377 | 12/2002 |
| WO | WO 2004/031023 | 4/2004 |

* cited by examiner

FUEL SAVING SENSOR SYSTEM

BACKGROUND

1. Field of the Invention

The present invention generally relates to a motor vehicle control system configured to reduce fuel consumption. More specifically, the present invention relates to a sensor system for shutting down the engine of a vehicle to reduce fuel consumption.

2. Description of Related Art

Many systems have been developed to improve the fuel efficiency of internal combustion engine powered vehicles. Recently, systems have been developed that automatically turn off the engine while the vehicle is stationary, for example at stop lights or in stop and go traffic. When the vehicle needs to move, the engine is immediately restarted to power the vehicle. Such vehicles have provided significant improvements in fuel efficiency. Tests have shown that one such model has improved fuel savings by 15% in congested traffic. Such systems turn off the engine based on vehicle parameters such as vehicle speed, braking, and acceleration. Further, these parameters are monitored in order to determine whether the engine should remain stopped or be restarted. For example, the engine is typically not turned off when the vehicle speed is above 6 kph.

Despite the benefits of present intermittent stop type systems for motor vehicles, there is a continuing need to enhance the fuel efficiency of such systems.

SUMMARY

In satisfying the above need, as well as overcoming the enumerated drawbacks and other limitations of the related art, the present invention provides a system configured to reduce fuel consumption based on the motion characteristics of a lead vehicle.

The system includes an engine for propelling the vehicle, a sensor unit, and a controller. The engine provides a driving motion for the vehicle. The sensor unit is configured to determine the range of a leading vehicle. The controller is in communication with the engine and the sensor unit, such that the controller may shut down the engine based on the range of the lead vehicle as determined by the sensor unit in addition to other control inputs.

The sensor unit may include various range measurement devices including range measurement sensors such as lidar, radar, or vision devices. In addition, the sensor unit may include a vision sensing device, such as a camera, with an image processor, where the camera is configured to take an image including the lead vehicle and the image processor is configured to analyze the image to determine motion characteristics, such as range, velocity, and acceleration of the vehicle. The controller may also use a number of other vehicle parameters in determining when to issue the shut down command to the engine. Accordingly, the controller may issue the engine shut down command based on any combination of the range of the leading vehicle, the closing velocity of the leading vehicle, braking system characteristics, vehicle acceleration, and vehicle speed.

To accommodate the engine shut down, the controller may also disengage the transmission from the engine and increase the brake pump output to compensate for a loss of brake assistance due to the engine shut down. Further, the system may include an alternator-motor, where the controller may use the alternator-motor in restarting the engine after shut down when the user decides to accelerate or no braking condition exists.

Further objects, features and advantages of this invention will become readily apparent to persons skilled in the art after a review of the following description, with reference to the drawings and claims that are appended to and form a part of this specification.

DETAILED DESCRIPTION

Figure 1:
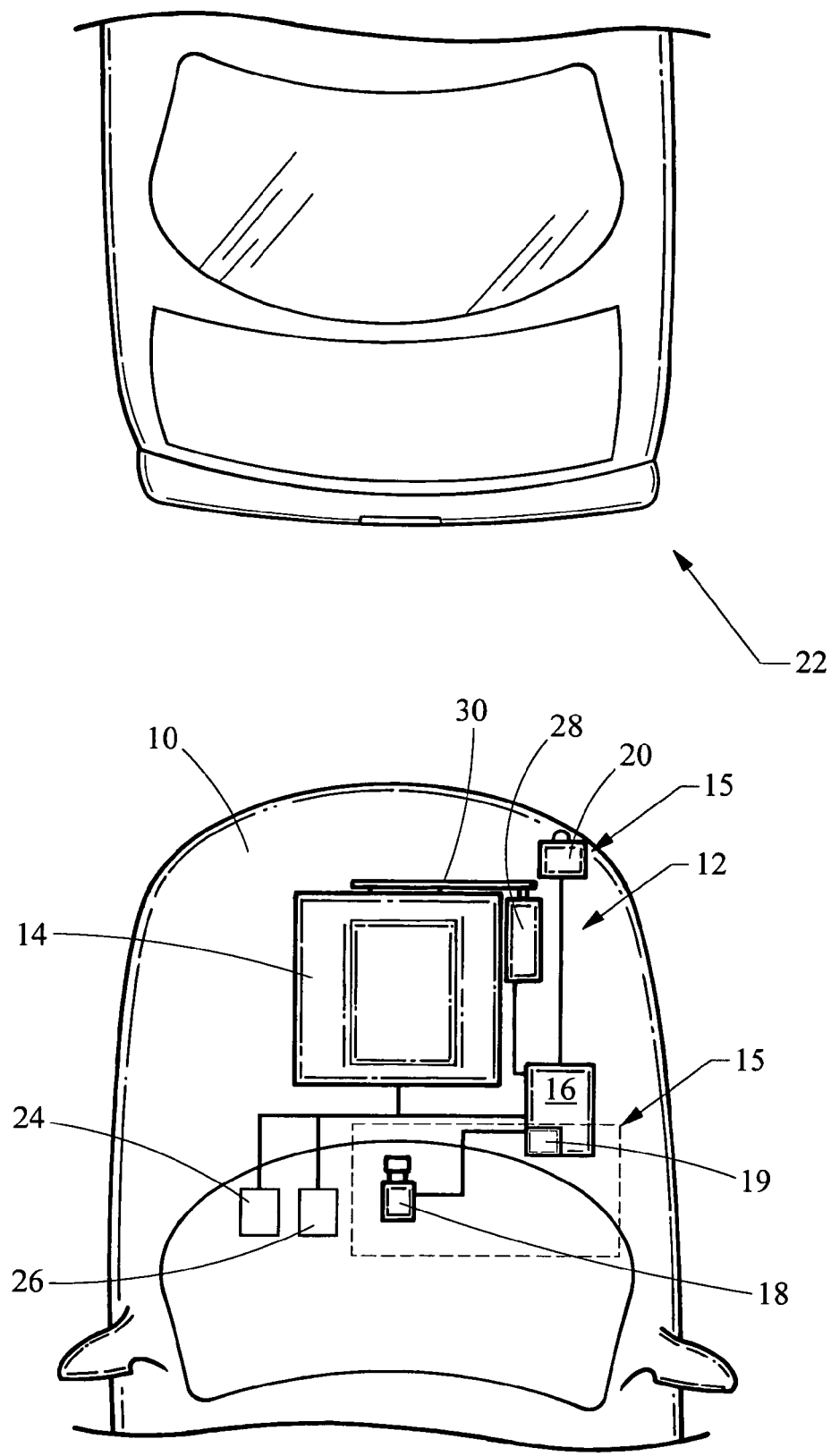
FIG. 1 is a diagrammatic view of a system to reduce fuel consumption based on the range of a lead vehicle in accordance with the present invention.

Referring now to FIG. 1, a vehicle 10 includes a system 12 embodying the principles of the present invention. As its primary components, the system 12 includes an engine 14, a controller 16, and a sensor unit 15. The controller 16 is in electrical communication with the engine 14 to sense engine parameters and provide control commands to the engine 14. The sensor unit 15 may include a laser based range sensor, a sonic range sensor, a radar range sensor or a vision sensor as denoted by reference numeral 20. The sensor unit 15 may also include a camera 18 and an image processor 19. In this scenario, the camera 18 is configured to take an image of the leading vehicle 22. The image processor 19 is configured to receive the image from the camera 18 and determine motion characteristics such as the range, closing velocity, and acceleration of the leading vehicle 22 based on the image. The image processor 19 is in electrical communication with the controller or may be integrated with the controller 16 to provide the controller 16 with motion characteristics of the leading vehicle 22. The controller 16 is configured to provide an engine shut down command to the engine 14 to shut down operation of the engine 14 based on the motion characteristics. Shutting down the engine may take the form of discontinuing fuel flow and spark events to the engine 14 such that the engine no longer provides a positive drive to the vehicle 10. The controller 16 is also configured to analyze other vehicle information and determining when to issue an engine shutdown command. For example, the controller 16 is configured to store multiple range measurements from the sensor unit 15 over a time period (possibly multiple seconds). Accordingly, the controller 16 may derive a closing velocity of the leading vehicle 22. The closing velocity is the relative velocity between the vehicle 10 carrying the system 12 and the leading vehicle 22. In addition, the controller 16 is in electrical communication with a throttle 24 and a braking system 26. Accordingly, the controller 16 may issue the engine shut down command also based on the throttle 24, the braking system 26 or any combination of the throttle 24, the braking system 26, the range, or the closing velocity.

In one aspect of the invention, the controller 16 may issue a shut down command to the engine 14, if the range is below a range threshold and the throttle 24 is below a throttle threshold. Alternatively, the controller 16 may issue an engine shut down command when the range is below a range threshold, the closing velocity is above a closing velocity threshold, and the brake system has a brake duration period longer than a brake duration period threshold. Further, the controller 16 may issue a transmission disengage command when the controller issues an engine shut down command. This will allow the engine 14 to free wheel during shut down independent of the vehicle drive train. Further, the controller 16 may also communicate with the brake system 26 when an engine shut down command or engine start command is issued to the engine 14, to command that the brake system 26 increase braking output to compensate for the loss of brake assistance due to the suppression of the engine induced vacuum in the intake manifold. The loss of brake assistance can be compensated by increasing the brake pump output or by utilizing an external vacuum pump or hydraulic pump, which may be used with a pressure accumulator.

The system 12 also includes an alternator-motor 28. The alternator-motor 28 is in mechanical communication with the engine 14 through a coupling mechanism such as a belt drive or gear mechanism 30. The alternator-motor 28 is configured to operate in two modes. While the engine 14 is running, the engine 14 drives the alternator-motor 28 in alternator mode to create electrical energy that may be used to power the vehicle's electrical systems and recharge the vehicle battery system. When the engine 14 is shut down, the alternator-motor 28 may be provided electrical power to operate in a motor mode. In motor mode, the alternator-motor 28 provides torque power through the belt drive 30 to the engine 14 allowing the engine 14 to quickly spin up and restart to resume driving vehicle motion. In addition, the transmission unit will be re-engaged and the brake system notified of the engine restart. The engine 14 may be restarted based on the accelerator input of the throttle system 24. In another instance, the engine 14 may be restarted by the controller 16 when braking is not predicted and the braking system 26 is not currently braking. The braking may be predicted or not predicted based on the closing velocity of the leading vehicle 22 and the range of the leading vehicle 22. For example, if the lead vehicle is speeding up, a decrease in the closing velocity and an increase in the range will result. Accordingly, the engine can be restarted. Alternatively, if no braking is present or after a braking action is terminated the engine 14 may also be restarted. The start of the engine 14 consumes the equivalent of a few seconds of fuel at an engine idle rate. Therefore, shutting down the engine 14 is beneficial when the shut down lasts for more than a few seconds to overcome the initial restart fuel consumption.

For example, if a braking event will last for more than a few seconds, the engine 24 may be shut down by the controller 16. In another instance, if the lead vehicle 22 is slowing down which may result in a braking or coasting action by the vehicle 10 carrying the system 12, the engine 14 may also be shut down during this period.

Figure 2:
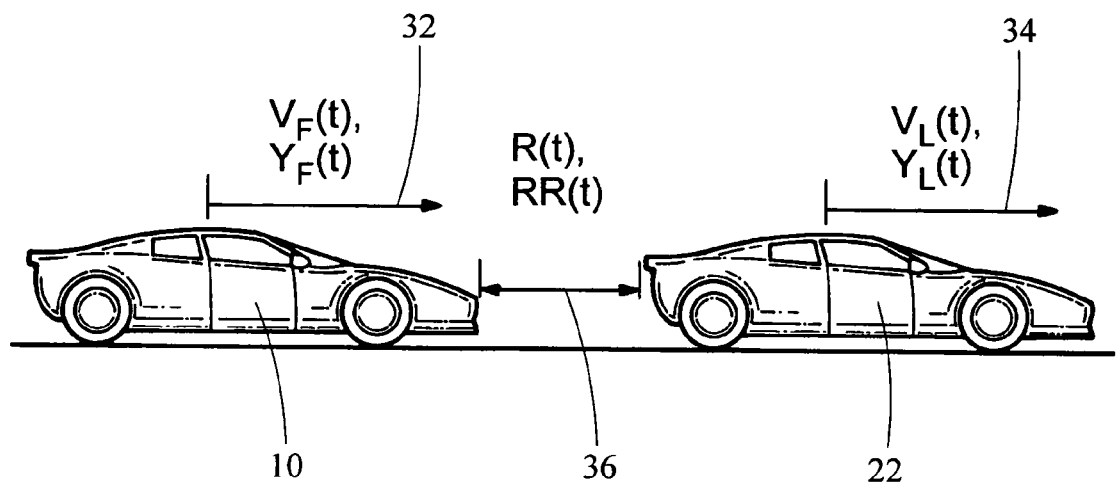
FIG. 2 is a side view of a lead vehicle and a vehicle implementing the system in accordance with the present invention.

Now referring to FIG. 2, a side view of the host vehicle 10 is shown in relation to the leading vehicle 22. The velocity and acceleration of the host vehicle are parameters that are available from the internal vehicle systems and are illustrated by reference numeral 32. The velocity and acceleration of the leading vehicle 22 are not directly available to the controller 16 in determining when to issue an engine shut down command. The leading vehicle velocity and acceleration are denoted by reference numeral 34. However, the sensor unit 15 can provide the controller 16 a determination of the lead vehicle velocity and acceleration 34 by calculating of the range and closing velocity of the lead vehicle 22 in relation to the host vehicle 10. The range and closing velocity of the lead vehicle 22 are denoted by reference numeral 36.

Figure 3:
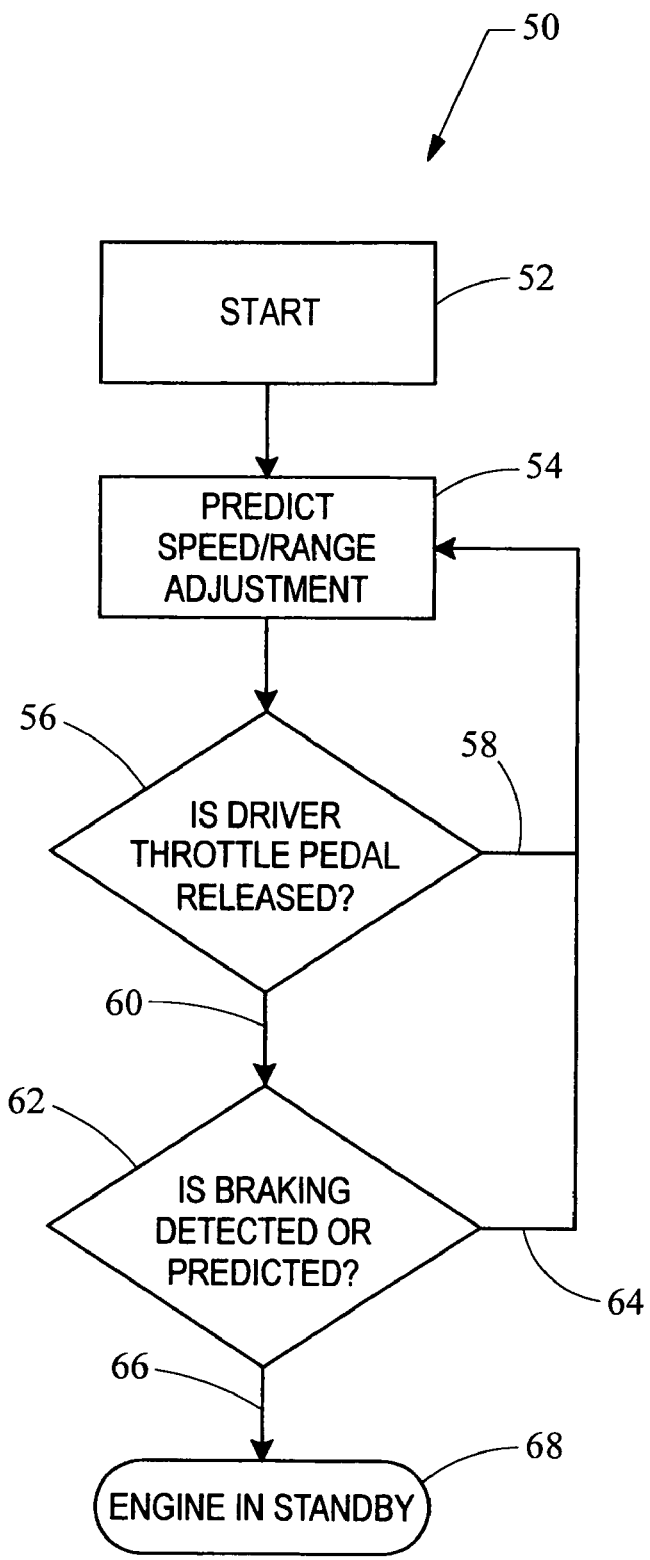
FIG. 3 is a flow chart illustrating the logic of the system in accordance with the present invention.

Now referring to FIG. 3, a method 50 is provided to determine when an engine shut down command is to be issued. The method starts in block 52 when the system is initialized. In block 54, the sensor unit 15 determines the motion characteristics, such as range closing velocity, and acceleration of the lead vehicle 22. In block 56, the controller 16 determines if acceleration pedal is released. If the acceleration pedal is not released and the throttle unit is accelerating, the logic flows along line 58 to block 54, where the sensors update the range and closing velocity measurements. If the acceleration pedal is released, the logic flows along line 60 to block 62. In block 62, the controller 16 determines if braking is detected or if braking is predicted. Braking may be detected by depression of the brake pedal or activation of a passive braking system. Braking may be predicted based on the range and closing velocity of the leading vehicle 22. In one example, braking may be predicted if the range is below a threshold range and the closing velocity exceeds a closing velocity threshold. If braking is not detected and braking is not predicted, the logic follows allow line 64 to block 54 where the range and closing velocity measurements are updated. Alternatively, if braking is detected or braking is predicted, the logic flows along line 66 and the controller 16 issues an engine shut down command to shut down the engine 14 as denoted by block 68. As discussed above, the engine may be restarted by the controller 16 if the acceleration pedal is depressed or if braking is not detected or not predicted.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

I claim:

1. A system for reducing fuel consumption of a vehicle, the vehicle including an engine for driving vehicle motion, the system comprising:
   a sensor unit configured to determine motion characteristics of a leading vehicle;
   a controller in electrical communication with the engine and the sensor unit, wherein the controller is configured to shut down the engine based on the motion characteristics of the leading vehicle; and
   wherein the controller is configured to restart the engine based on the range of the leading vehicle.

2. The system according to claim 1, wherein the sensor unit includes a vision sensor and an image processor, the camera being configured to take an image of the leading vehicle and the image processor being in electrical communication with the camera to determine the motion characteristics of the leading vehicle based on the image.

3. The system according to claim 1, wherein the sensor unit includes a laser based range measurement sensor to determine the motion characteristics of the leading vehicle.

4. The system according to claim 1, wherein the sensor unit includes a radar sensor configured to determine the motion characteristics of the leading vehicle.

5. The system according to claim 1, wherein the controller is configured to disengage a vehicle transmission based on the motion characteristics of the leading vehicle.

6. The system according to claim 1, wherein the controller is configured to increase a brake pump output when the engine is shut down or started.

7. The system according to claim 1 wherein the controller is configured to shut down the engine based on a closing velocity of the leading vehicle.

8. The system according to claim 1, wherein the controller is configured to shut down the engine based on a range of the leading vehicle.

9. The system according to claim 1, wherein the controller is configured to shut down the engine based on acceleration of the leading vehicle.

10. The system according to claim 1, wherein the controller is in electrical communication with a braking system of the vehicle and the controller is configured to shut down the engine based on a braking signal from the braking system.

11. The system according to claim 10, wherein the controller is configured to shut down the engine when a braking time of the braking system exceeds a threshold braking time.

12. The system according to claim 1, wherein the controller is in electrical communication with the throttle, the controller being configured to shut down the engine based on a throttle signal from the throttle.

13. The system according to claim 12, wherein the controller is configured to shut down the engine when the throttle level is below a threshold throttle level.

14. The system according to claim 1, wherein the controller is configured to shut down the engine based on vehicle speed.

15. The system according to claim 14, wherein the controller is configured to shut down the engine when the vehicle speed is below a threshold vehicle speed.

16. The system according to claim 1, further comprising an alternator-motor, the alternator-motor being configured to generate electrical power when the engine is running, and generate a torque input to start the engine when the engine is shut down.

17. The system according to claim 16, wherein the controller is configured to restart the engine when the range of the lead vehicle exceeds a threshold range.

* * * * *